US007138611B2

(12) United States Patent
Yang

(10) Patent No.: US 7,138,611 B2
(45) Date of Patent: Nov. 21, 2006

(54) HEATING STRUCTURE AND ITS TEMPERATURE CONTROL METHOD

(76) Inventor: Shuh-Tsai Yang, 2F-7, No. 12, Lane 609, Sec. 1, Chung Shin Rd., San Chung City, Taipei Hsien (TW)

( * ) Notice: Subject to any disclaimer, the term of this patent is extended or adjusted under 35 U.S.C. 154(b) by 0 days.

(21) Appl. No.: 11/068,813

(22) Filed: Mar. 2, 2005

(65) Prior Publication Data

US 2006/0196868 A1 Sep. 7, 2006

(51) Int. Cl.
*H05B 1/02* (2006.01)
*H05B 3/36* (2006.01)
*G05D 23/20* (2006.01)

(52) U.S. Cl. ...................... 219/505; 219/501; 219/504; 219/492; 219/494; 219/212

(58) Field of Classification Search ................ 219/505, 219/504, 501, 492, 212; 361/494
See application file for complete search history.

(56) References Cited

U.S. PATENT DOCUMENTS

| | | | | | |
|---|---|---|---|---|---|
| 4,485,296 | A * | 11/1984 | Ueda et al. | | 219/505 |
| 5,081,341 | A | 1/1992 | Rowe | | 219/505 |
| 5,640,113 | A * | 6/1997 | Hu | | 327/162 |
| 5,770,836 | A * | 6/1998 | Weiss | | 219/481 |
| 5,861,610 | A | 1/1999 | Weiss | | 219/497 |
| 5,986,242 | A * | 11/1999 | Maitani et al. | | 219/501 |
| 6,097,009 | A * | 8/2000 | Cole | | 219/528 |
| 6,157,010 | A * | 12/2000 | Mine | | 219/501 |
| 6,222,162 | B1 | 4/2001 | Keane | | 219/481 |
| 6,252,198 | B1 * | 6/2001 | Malkin | | 219/212 |
| 6,300,597 | B1 | 10/2001 | Lee | | 219/212 |
| 6,310,322 | B1 | 10/2001 | Yang et al. | | 219/386 |
| 6,310,332 | B1 * | 10/2001 | Gerrard | | 219/505 |
| 6,586,712 | B1 * | 7/2003 | Mathews et al. | | 219/505 |
| 6,617,550 | B1 * | 9/2003 | Sowa et al. | | 219/212 |
| 6,703,593 | B1 * | 3/2004 | Sopory | | 219/505 |
| 6,768,086 | B1 | 7/2004 | Sullivan et al. | | 219/494 |
| 6,770,853 | B1 * | 8/2004 | Krieger et al. | | 219/497 |
| 6,841,761 | B1 * | 1/2005 | Banzato et al. | | 219/486 |
| 2003/0047556 | A1 * | 3/2003 | Horey et al. | | 219/497 |

* cited by examiner

*Primary Examiner*—Robin O. Evans
*Assistant Examiner*—Stephen J. Ralis
(74) *Attorney, Agent, or Firm*—Troxell Law Office, PLLC

(57) ABSTRACT

A heating structure and its temperature control method having therein a heat generating line and a controller. The heat generating line includes a PTC element and a short circuit line serially connected having an insulating fusible layer separating them. When a user sets a heating temperature, electric current is conducted to heat the PTC element, alternative string wave signals input into an AC phase shaping circuit and an AC phase delay shaping circuit are converted into square wave signals; and by measuring with a microprocessor at a given time the phase shift between the two phase shaping circuits to control the switch of a trigger circuit, the PTC element can keep on heating or reduce its temperature to therefore keep the heat generating line at a predetermined working temperature. The structure is applicable to heat generating devices such as electric ovens and heating blankets etc.

10 Claims, 8 Drawing Sheets

HEATING STRUCTURE AND ITS TEMPERATURE CONTROL METHOD

BACKGROUND OF THE INVENTION

1. Field of the Invention

The present invention relates to a heating structure and its temperature control method, and more particularly to performing heating with a PTC element, by the feature of the PTC element for direct current square wave signals respectively converted by an AC phase shaping circuit and an AC phase delay shaping circuit to generate phase shifting to immediately control turning on/off of a trigger circuit, thereby the PTC element is heated or reduced in temperature and therefore a heat generating line can keep at a predetermined working temperature. The present invention is applicable to heat generating devices such as electric ovens, and heating blankets etc.

2. Description of the Prior Art

Heating structures have been widely used in the markets now; such as shown in FIG. 7 which depicts a quite normal heating pad structure, it is provided mainly on a bag with a set of electric conductive plates a1 stacking one on the other, the two electric conductive plates a1 are sandwiched therebetween a plurality of ceramic electric resistances a2, and a soft heat durable insulating member a3 envelops the two electric conductive plates a1 to form the heating pad "a". The ceramic electric resistances a2 is a positive temperature coefficient (PTC) element; when the two electric conductive plates a1 are electrically turned on, the resistance of the PTC element will have a hasty change in pursuance of rising of temperature; when the value of the resistance is increased to render the electric current unable to be conducted, a circuit breaking is formed, and a fixed temperature can be obtained under control.

And as shown in FIG. 8 which shows a structure disclosed in a U.S. Pat. No. 5,081,341 to directly make short circuit of a heat-generating electric resistant line b1 in a fabric "b" and to make two contact portions b2 protrude outwards, and also to control conduction of electric current by switching a switch b3 for heating. This technique does not disclose timely measuring as the former conventional technique does, and is unable to make multistage temperature control.

Therefore, the heating mode using a PTC element as a measuring structure in cooperation with a heat generating line to adjust and control temperature is widely used. As shown in FIG. 9 which shows a U.S. Pat. No. 5,861,610, a core member "c" is wound and enveloped thereover with a heating conductive line c1, a second insulating layer c2, a measuring line c3 and a first insulating layer c4 sequentially, the measuring line c3 is made of PTC material (nickel alloy). When the temperature of the measuring line c3 is raised following rising of the temperature of the heating conductive line c1, or the resistance of the measuring line c3 is changed by a high temperature, a comparing circuit in a controller compares and adjusts the amount of current input to the heating conductive line c1 with the result of comparing to control the heat-generating temperature to be within the range set by a user.

The abovementioned techniques were also disclosed in a U.S. Pat. No. 6,300,597, a U.S. Pat. No. 6,310,322 and a U.S. Pat. No. 6,768,086. Moreover, as shown in FIG. 10 which shows a circuit control diagram of a U.S. Pat. No. 6,222,162, the patent disclosed another example of application of a PTC element, the big difference of which from the above conventional structures is that, it uses a single PTC alloy; it controls turning on or breaking of a circuit by measuring its resistance and voltage changed after heating, thus an objective of heating with a constant temperature can be achieved.

We can see from the above granted patent cases that, direct generating heat with a heat-generating electric resistant line or using a PTC element on a temperature controlling and measuring technique is quite known and used presently, however, the above various modes have rooms for improvement:

1. Most of the conventional techniques shall each have simultaneously two loops including a heating and a measuring loop provided in a heating pad or a heat generating structure, and shall each have four contacting portions extended outwards (to respectively connect with two loops), and shall respectively connect with a heating and a comparing circuit, allocation of their electronic elements appears complicate, this will increase the cost of production and the rate of fault.
2. No matter two functions of heating and measuring are simultaneously obtained by using a single PTC alloy, or the two functions are obtained by using two different loops, when a temperature controlling device of a heat generating structure is damaged, its heating conductor will continue to heat, thereby a danger of conflagration can be induced. The above conventional techniques did not provide a guarantee of safety by making good uses of the features of the PTC elements.

In view of this, and in order to get rid of the above defects to render a heat generating structure and its temperature control method not only able to control temperature by the feature of the PTC element to simplify the composition of the element and save the cost of material as well as lower the rate of fault, but also able to automatically turn off in case of overcurrent to obtain an effect of safety and protection, the inventor developed the present invention based on his experience of years and nonstop study as well as improvement.

SUMMARY OF THE INVENTION

The primary objective of the present invention is to provide a temperature control method for a heating structure, wherein by the feature of a PTC element, in cooperation with comparing of direct current square wages generated by an AC phase shaping circuit and an AC phase delay shaping circuit, continuous heating with a low temperature can be performed, and the heating process can be automatically turned off at a high temperature, thus the working temperature set by a user can be controlled.

The secondary objective of the present invention is to provide a heating structure, in which by connecting a PTC element with a short circuit line, two contact points of a heat generating line protrude out of a bag to connect a controller, so that the composition of the PTC element is simplified, and the cost of material is reduced, and the rate of fault can be lowered.

To achieve the above stated objectives of the present invention, a temperature control method for a heating structure provided by the present invention comprises the following steps: a. setting a heating temperature; b. making conduction of electric current to heat a PTC element, and to render a part of current to be input into an AC phase shaping circuit to shape them into direct current square waves; c. entering a part of current into an AC phase delay shaping circuit to delay string wave signals, and then to convert them into square wave signals; d. during the process of heating, measuring and comparing by a microprocessor at a given time the phase shift between the direct current square wave signals respectively converted by the AC phase shaping circuit and the AC phase delay shaping circuit; and e. controlling the switch of a trigger circuit to form a turning on or off state, in order to heat or reduce the temperature of the PTC element to keep a heat generating line at a predetermined working temperature.

A heating structure comprises a heat generating line and a controller. The heat generating line includes a core member, the PTC element, an insulating fusible layer and a short circuit line, the PTC element is connected with one end of the short circuit line, and can generate heat after being electrically conducted. The controller is connected respectively with the PTC element and the other end of the short circuit line, it includes an electric circuit board provided with the AC phase shaping circuit and the AC phase delay shaping circuit to convert alternative string wave signals into square wave signals, and temperature rising of the PTC element can change the phase shift between the two phase shaping circuits when the current flows through the AC phase delay shaping circuit changes, hence the phase shift between the two phase shaping circuits can be changed.

Thereby, after the measuring of a microprocessor provided on the electric circuit board, the turning on or off state of a trigger circuit can be controlled to heat or reduce the temperature of the PTC element to keep the heat generating line at a predetermined working temperature.

The present invention will be apparent after reading the detailed description of the preferred embodiments thereof in reference to the accompanying drawings.

DETAILED DESCRIPTION OF THE PREFERRED EMBODIMENT

Figure 1:
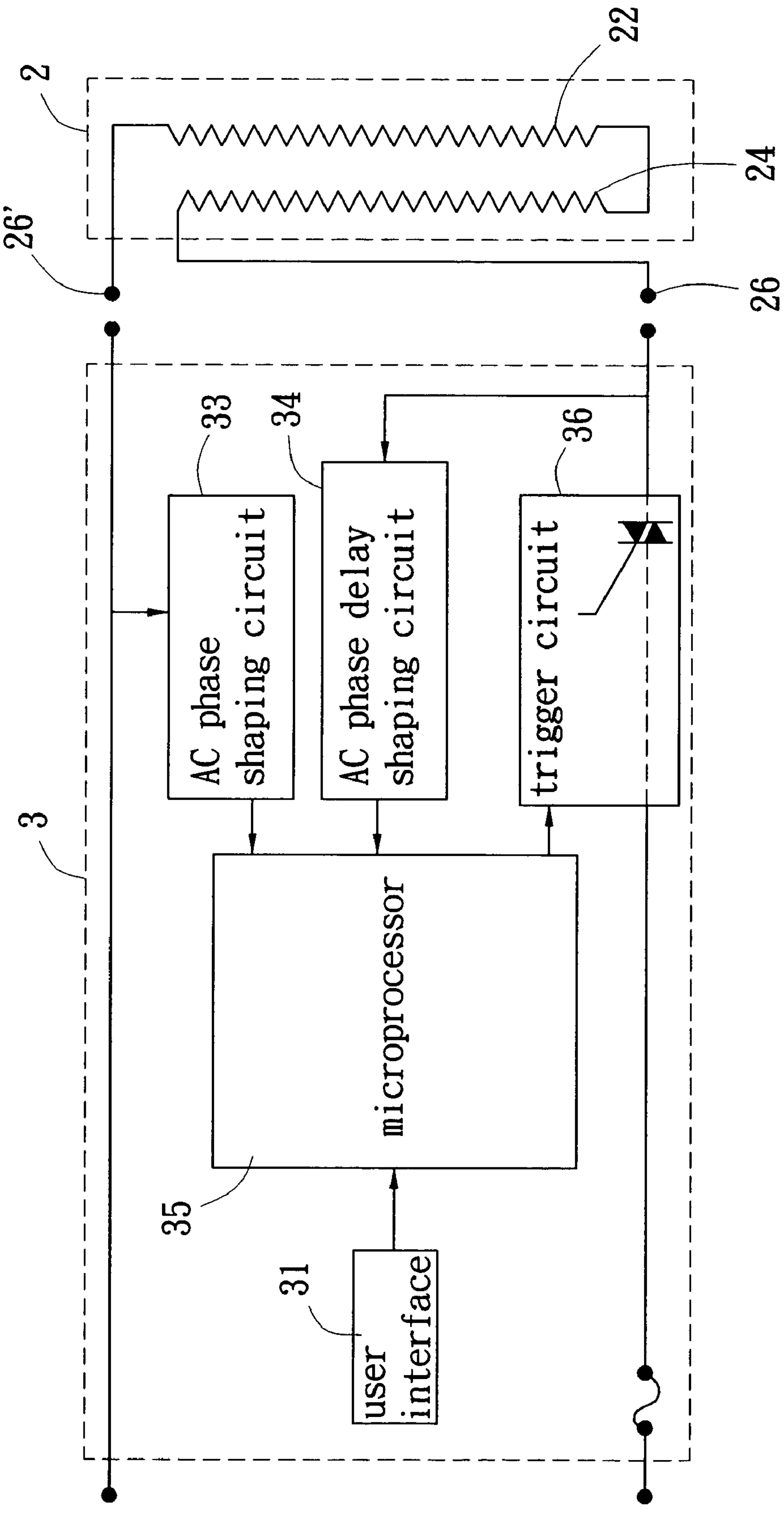
FIG. 1 is a schematic block diagram showing the circuit of the present invention.
Figure 2:
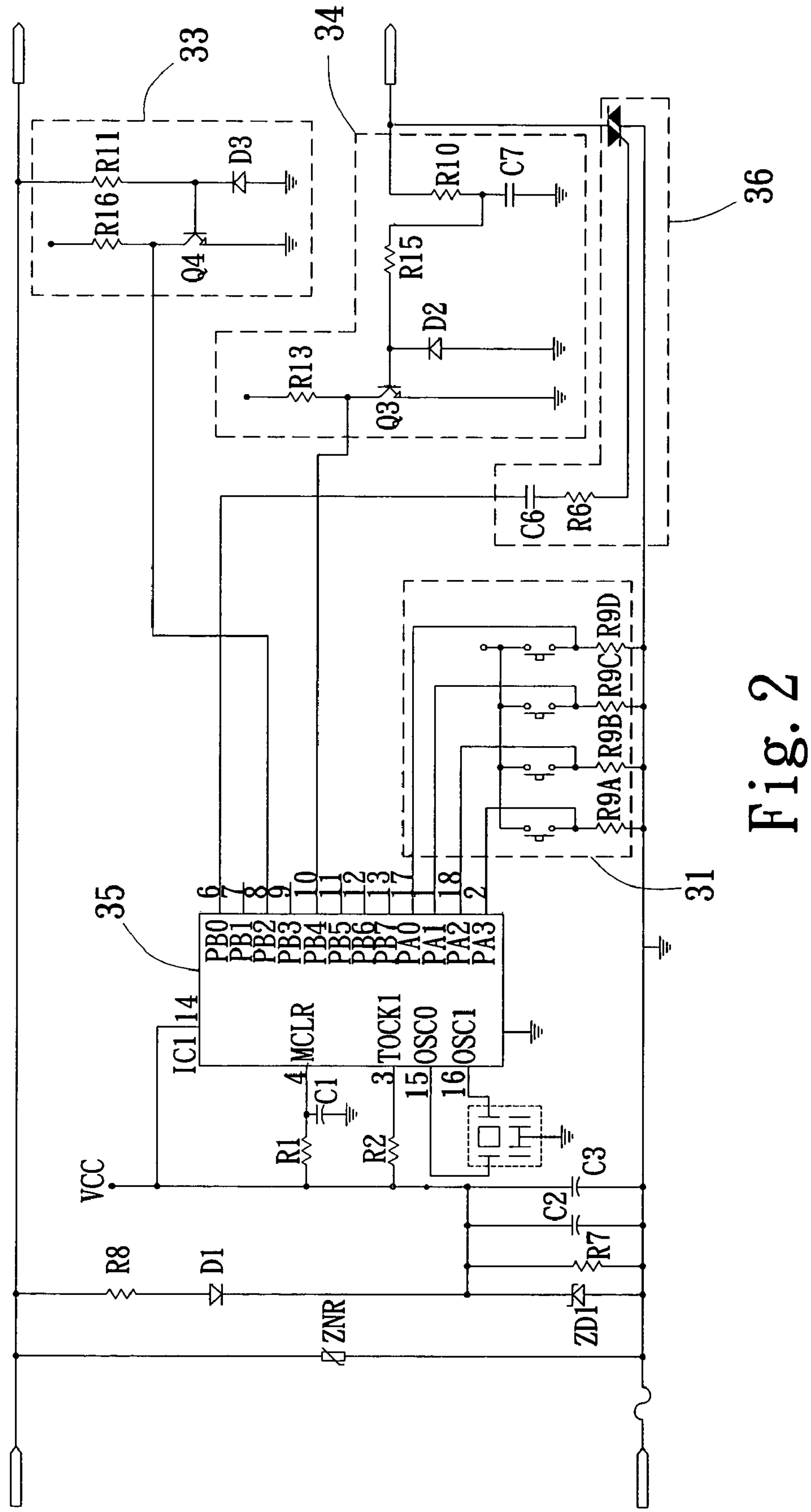
FIG. 2 is a circuit diagram of a controller of the present invention.

Referring to FIGS. 1 and 2, the temperature control method for a heating structure provided by the present invention comprises the following steps:

a. setting a heating time and a heating temperature with a user interface 31 to make electric conduction;

b. heating a PTC element 22 to render a part of current to be input into an AC phase shaping circuit 33 to shape them into direct current square waves;

c. entering a part of current into an AC phase delay shaping circuit 34 to delay string wave signals, and then to convert them into square wave signals;

d. during the process of heating the PTC element 22, measuring and comparing by a microprocessor 35 at a given time the phase shift between the direct current square wave signals respectively converted by the AC phase shaping circuit 33 and the AC phase delay shaping circuit 34; and e. controlling the switch/triac of a trigger circuit 36 to form a turning on or off state, in order to heat or reduce the temperature of the PTC element 22 to keep a heat generating line 2 at a predetermined working temperature.

Figure 3:
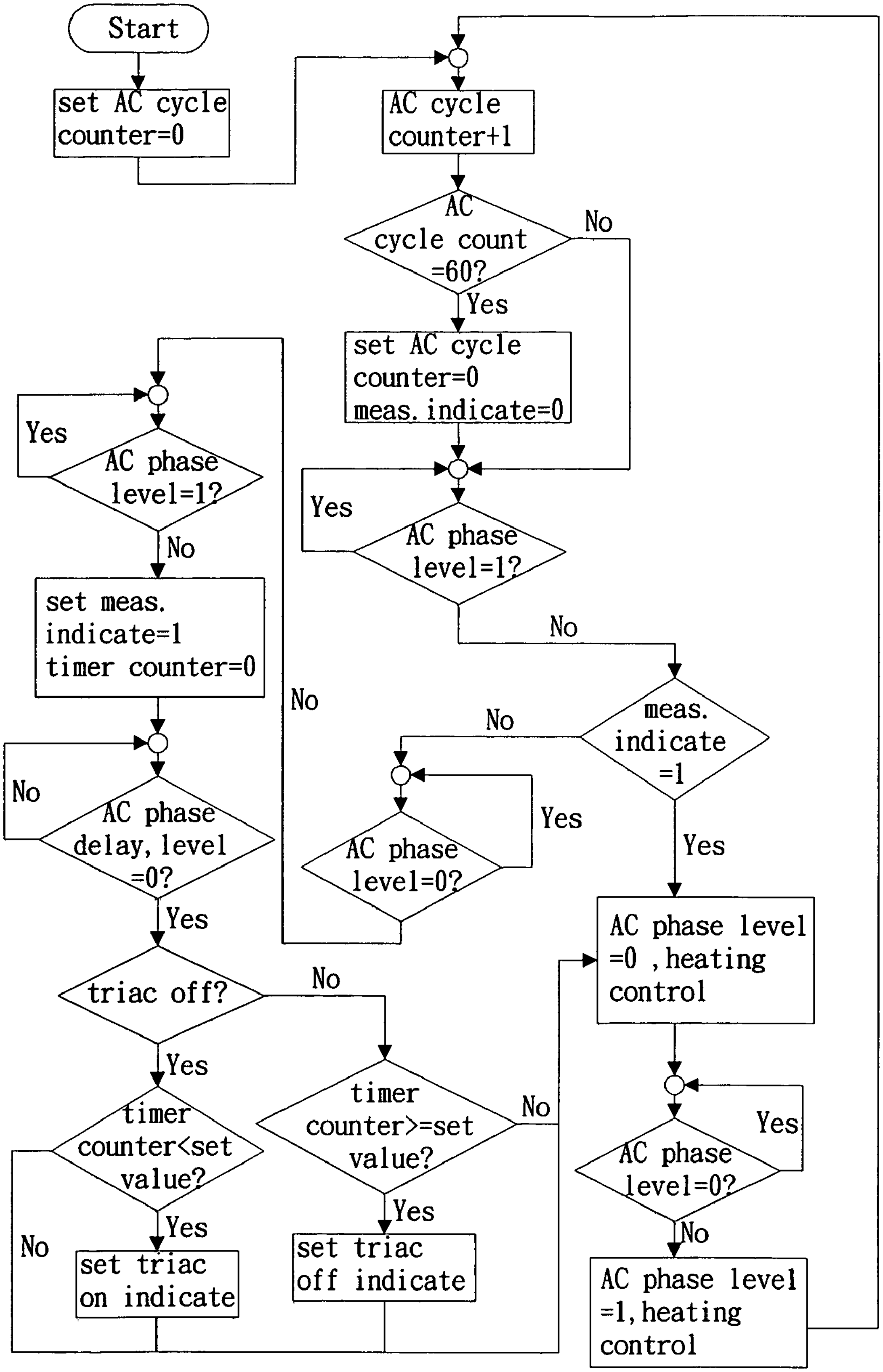
FIG. 3 is a flow chart showing heating and temperature controlling of an embodiment of the present invention in use.
Figure 4:
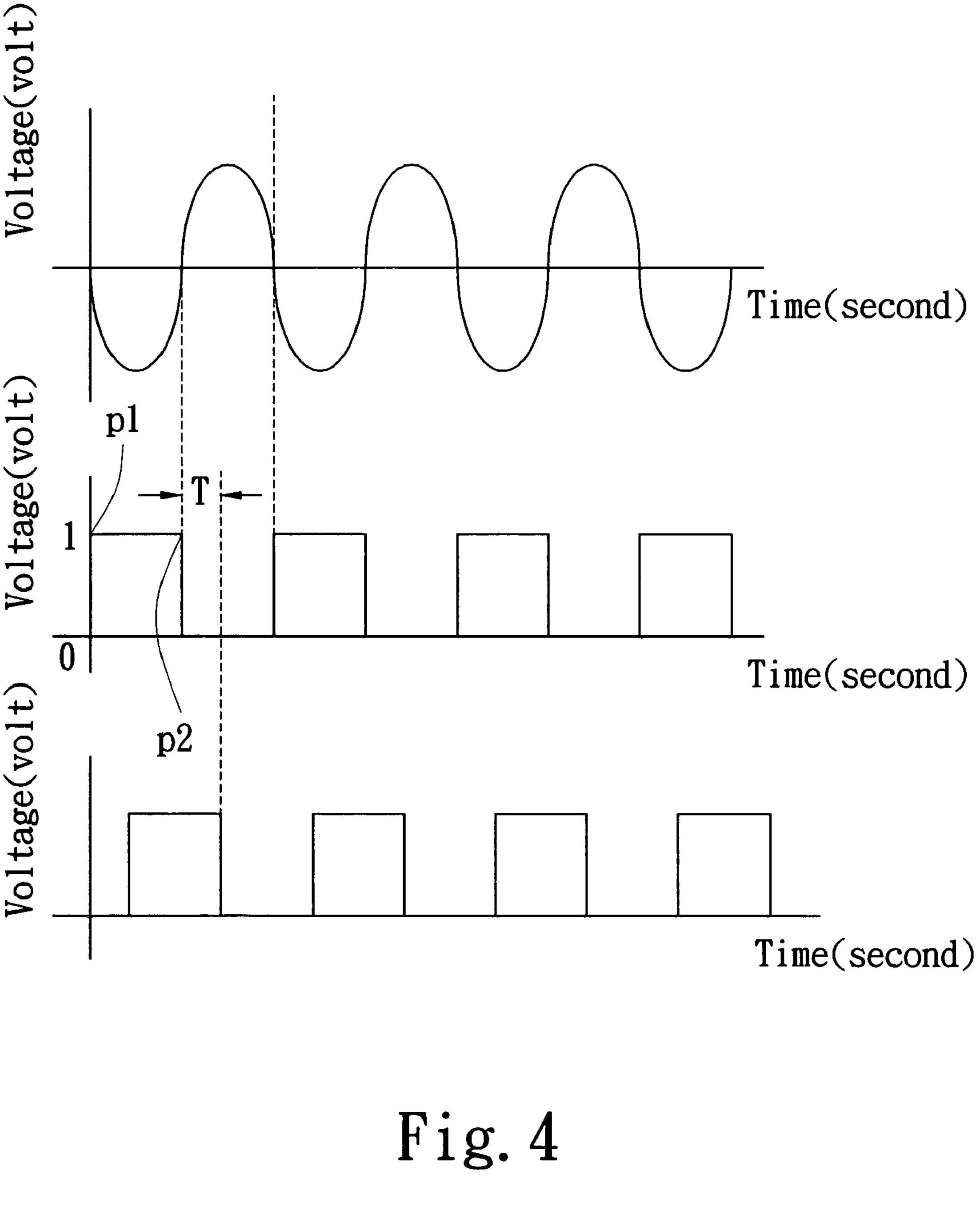
FIG. 4 is a schematic view showing the state of phase shifting of the embodiment of the present invention in use.
Figure 5:
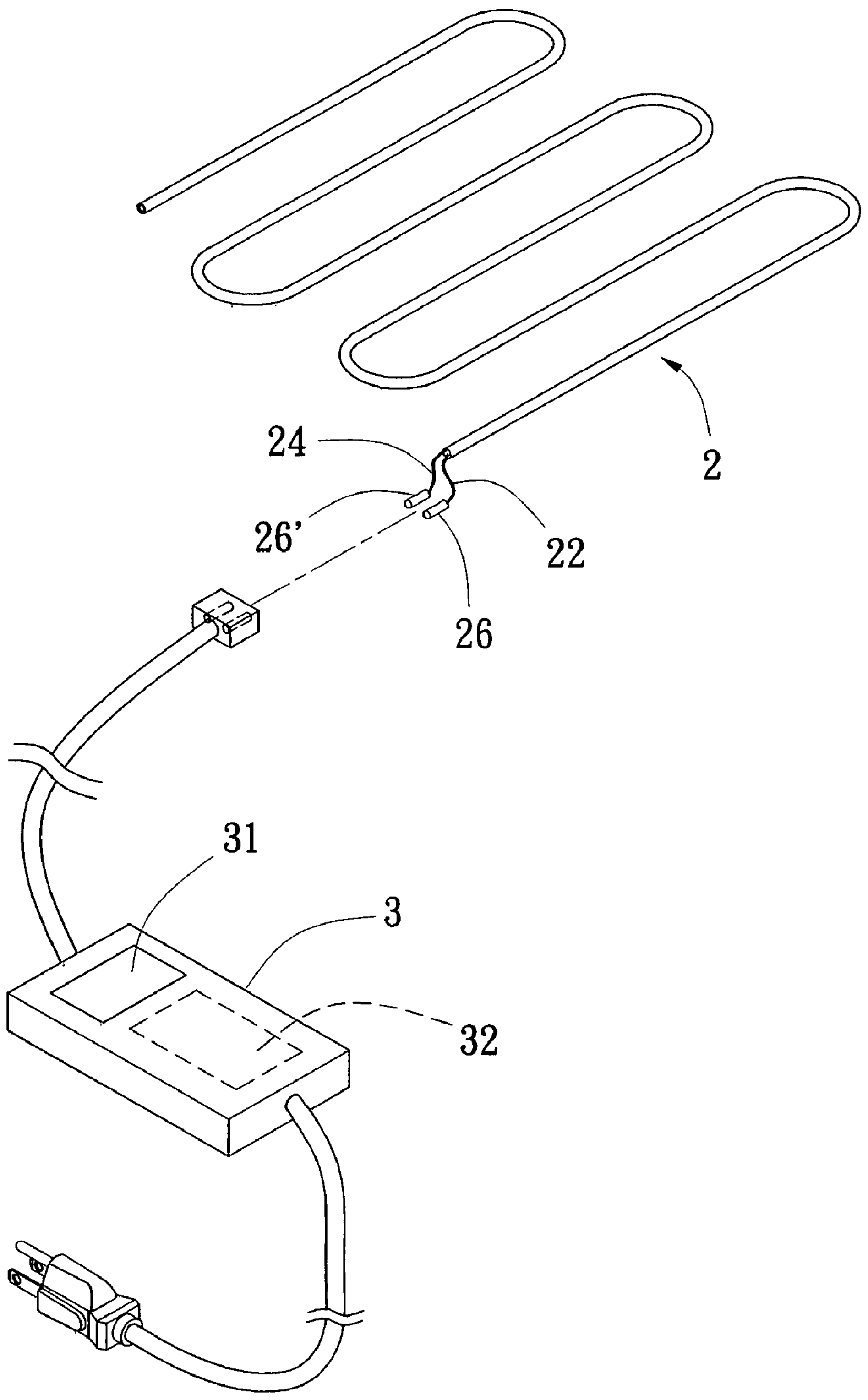
FIG. 5 is a perspective view showing the appearance of the embodiment of the present invention.
Figure 6:
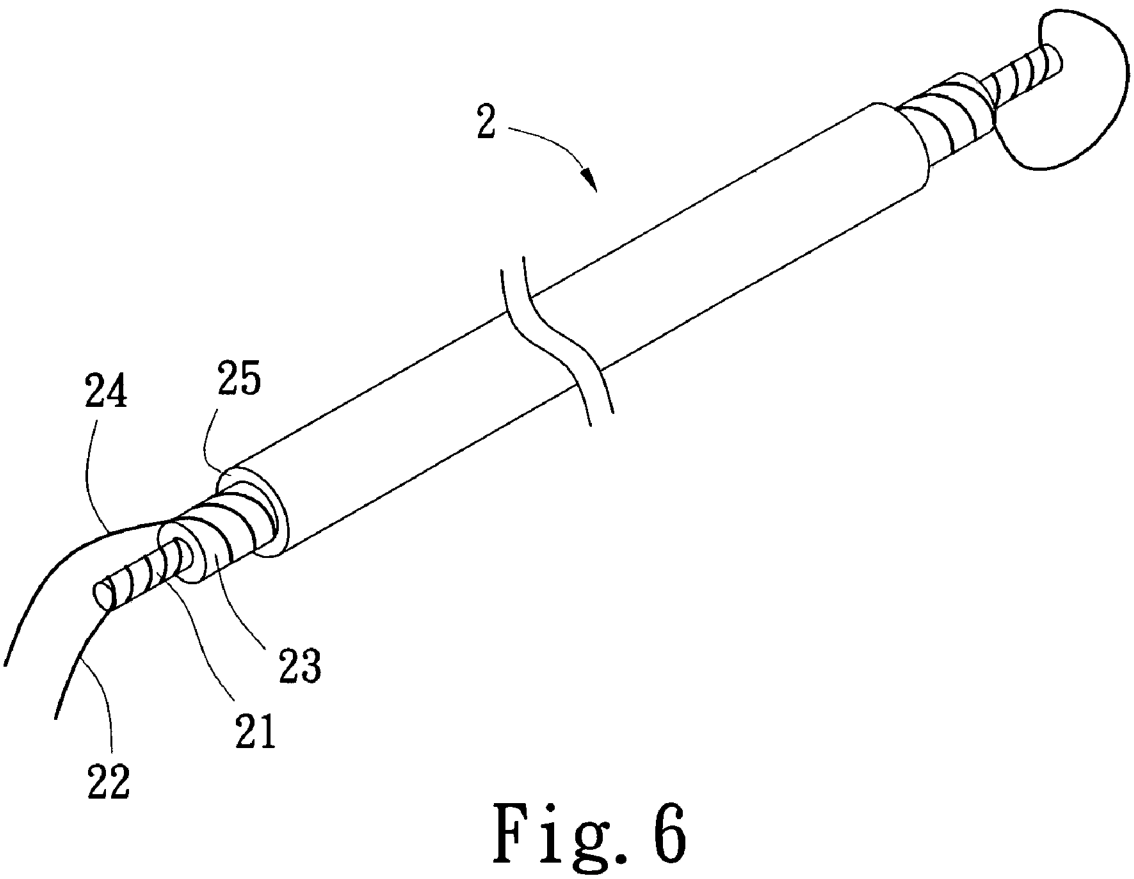
FIG. 6 is a perspective view showing the appearance of a heat generating line of the present invention.
Figure 7:
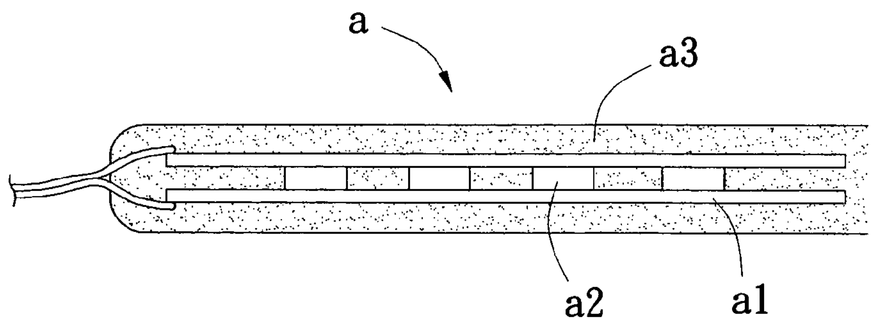
Fig. 7 (Prior Art)
FIG. 7 is a sectional view showing the structure of a conventional heating pad after assembling.
Figure 8:
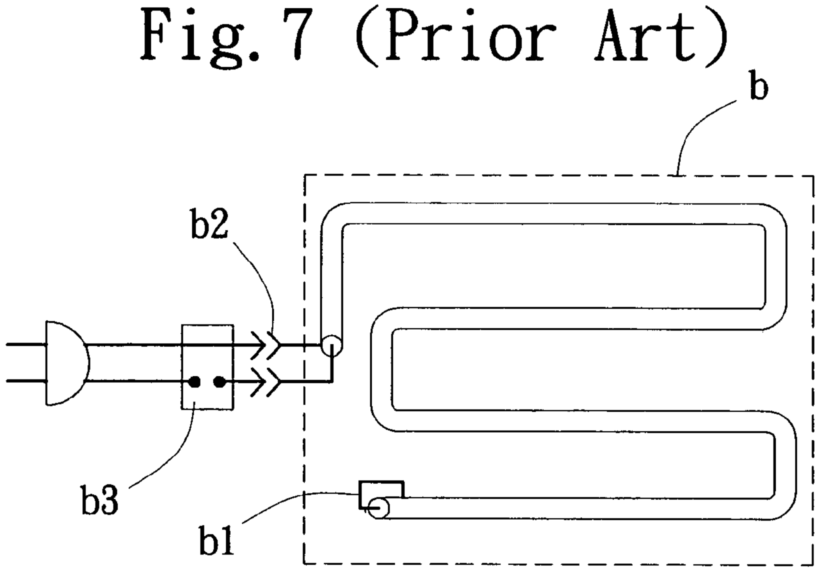
Fig. 8 (Prior Art)
FIG. 8 is a schematic view showing the structure disclosed in a U.S. Pat. No. 5,081,341.
Figure 9:
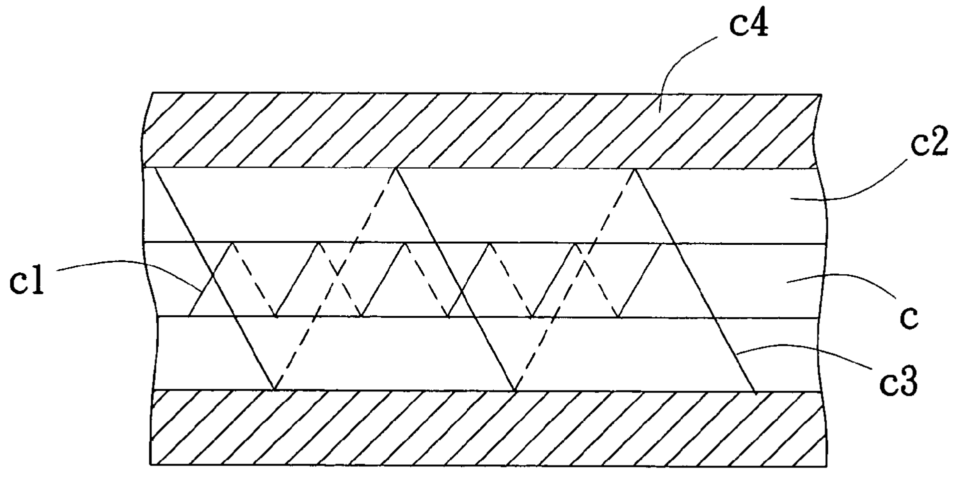
Fig. 9 (Prior Art)
FIG. 9 is a schematic view showing the structure of a heat generating line disclosed in a U.S. Pat. No. 5,861,610.
Figure 10:
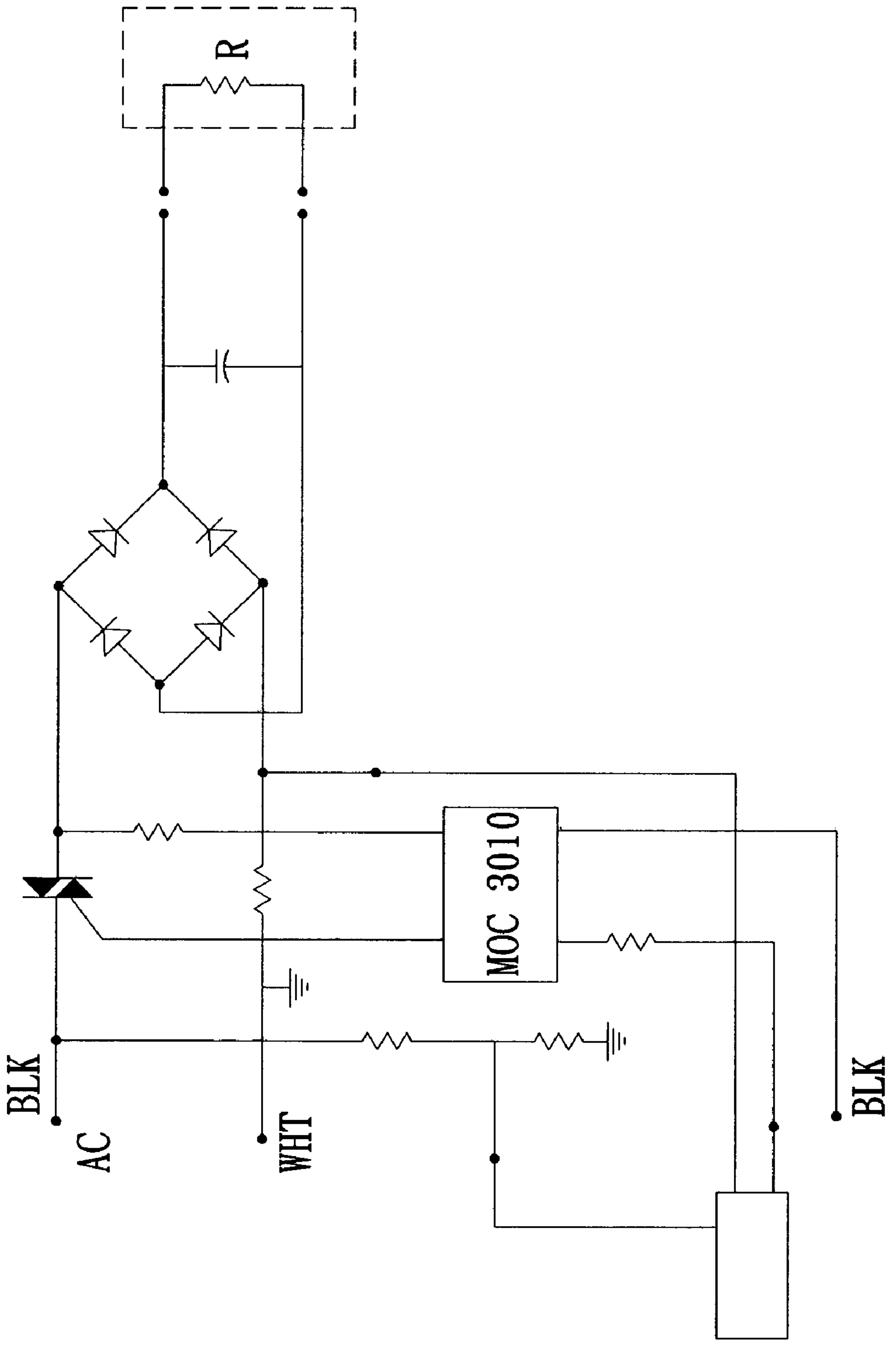
Fig. 10 (Prior Art)
FIG. 10 is a control circuit diagram of a U.S. Pat. No. 6,222,162.

Referring to FIGS. 3, 4, the present invention is further specified in its heating and temperature control method with an alternative current of an input frequency 60 Hertzes (Hz) as an example; firstly, a cycle counter for alternative current is set at 0, and the number of cycle of alternative current is gradually increased (each cycle increased means that time is increased for 1/60 second); when the total number of cycle is smaller than 60, the AC phase level is 0, and the measuring indication is 1, meantime, if a triac is in a state of circuit turning on, the trigger circuit 36 will output pulses under control, and triggers the switch (it is a triac) respectively at two points p1 and p2 to turn on the circuit for heating to continue temperature control until the measuring indication is 0 (namely, the number of cycle equals to 60), the trigger circuit 36 will no more output pulses to trigger the triac. At this time, the triac becomes a circuit breaking state, and a loop is formed from the heat generating line 2 to the AC phase delay shaping circuit 34 to output phase shift (as is shown in FIG. 4). The above step is set to measure once every second, while the time for measuring is about 1/60 second, and in practical application, different time can be set as required.

The above stated is a normal heating state within 1 second of the AC phase shaping circuit 33, when the measuring indication is 0, the triac at least has a time of a cycle that is not triggered, so that a capacitor can be completely charged and discharged to get an accurate measuring value.

After that, the measuring indication is reset to be 1 to avoid that repeated measuring occurs within 1 second, and the time counter also is set to be 0. As is stated before, when the phase shift (T) changed, by measuring and comparing with the microprocessor 35, the heat generating line 2 can be maintained at a temperature set by the user. When the AC phase level of the square wave signals converted by the AC phase delay shaping circuit 34 is 0, to check the former state of the triac, if the triac is turned off, and the time of the phase shift in the time counter is smaller than the time set by the user, the triac will keep on to be controlled and turned on; if the time of the phase shift in the time counter is not smaller than the time set by the user, the triac will keep on being in the state of turning off as before to keep on temperature controlling.

If the triac is turned on, and the time of the phase shift in the time counter is larger than or equals to the time set by the user, the triac will be turned off to stop heating; if the time of the phase shift in the time counter is smaller than the time set by the user, the triac will keep on being in the state of turning off as before to go on temperature controlling.

Referring to FIGS. 1, 2 and 5, 6 showing a preferred embodiment of a heating structure of the present invention, the heating structure 1 comprises a heat generating line 2 and a controller 3 electrically connecting with each other. When in practical application, the heat generating line 2 is enveloped thereover with a bag to be used as an electric heating blanket.

The heat generating line 2 includes a core member 21, a PTC element 22, an insulating fusible layer 23, a short circuit line 24 and a cover layer 25 arranged sequentially outwards from inside. The PTC element 22 is a line winding around the core member 21, the insulating fusible layer 23 is made of polyethylene (PE) with a melting temperature 125–130° C.; the short circuit line 24 is a conductor winding around the insulating fusible layer 23, and included therein at least a core line. The positions of the PTC element 22 and the short circuit line 24 can be changed mutually, one end of each of the PTC element 22 and the short circuit line 24 can be serially connected, the other ends of them form respectively as contact points 26, 26'.

The controller 3 is electrically connecting with the two contact points 26, 26', and includes a user interface 31 and an electric circuit board 32; the user interface 31 is provided thereon with a time and temperature controlling device, the electric circuit board 32 is provided thereon with an AC phase shaping circuit 33, an AC phase delay shaping circuit 34, a microprocessor 35 (of the type of PIC 16C54) and a trigger circuit 36. Wherein the AC phase shaping circuit 33 includes an npn bipolar transistor, a diode and a resistor; the AC phase delay shaping circuit 34 includes a resistor-capacitor (RC) circuit, an npn bipolar transistor, a diode and a resistor; while the trigger circuit 36 includes a switch to control conducting or non-conducting of current, which switch is a triac. The resistor-capacitor (RC) circuit can be used to form phase delay.

When operating, a user can input via the user interface 31 to set the time and temperature of use to make conducting of current, at this time, the triac of the trigger circuit 36 is in the on state, the input alternative current forms a loop through the PTC element 22, the short circuit line 24 and the triac of the trigger circuit 36 to start to heat the PTC element 22.

In the above stated circuit, the part of alternative current input from an electric power source converts alternative string wave signals into square wave signals through the AC phase shaping circuit 33 in the electric circuit board 32, and is put in the microprocessor 35 to be used as a reference of comparison. While after the alternative current flows through the PTC element 22 and the short circuit line 24, part of its current enters the AC phase delay shaping circuit 34, and by the characteristic of the time constant of the resistor-capacitor (RC) circuit, the string wave signals are delayed and are converted into square wave signals. The direct current square wave signals respectively converted by the above stated AC phase shaping circuit 33 and the AC phase delay shaping circuit 34 can form therebetween a phase shift (T) of predetermined time (as is shown in FIG. 4), by measuring and comparing with the microprocessor 35, the triac of the trigger circuit 36 is controlled to be in the on or off state.

When the temperature of the PTC element 22 is raised following increasing of the heating time, the resistance of the PTC element 22 gets larger gradually correspondingly, so that the current flowing through the AC phase delay shaping circuit 34 is synchronically changed (become smaller) to make the phase shift (T) larger; such a change will be sensed by the microprocessor 35, and the temperature of the PTC element 22 can be obtained by calculation. When the temperature reaches the temperature set by the user, the microprocessor 35 commands to switch the trigger circuit 36 to an off state, and the entire loop becomes off.

When the triac of the trigger circuit 36 is switched to be in the off state, the temperature of the PTC element 22 starts to be lowered, by the basic characteristic of the material of the PTC element 22, the current flowing through the AC phase delay shaping circuit 34 synchronically becomes larger to make the phase shift (T) reduced. The microprocessor 35 senses such a change, and the trigger circuit 36 is switched to be in the on state, and the entire loop becomes on again to reheat the PTC element 22. Therefore, the heat generated by the heat generating line 2 can be maintained at a predetermined temperature set by the user and the over heat situation can be avoid.

However, when the circuit of the controller 3 is damaged and is out of control to be in the off state, the PTC element 22 will be kept on being heated, when its temperature is over 130° C., the insulating fusible layer 23 starts to be molten, the PTC element 22 will contact the short circuit line 24 to make a short circuit. At this time, the insulating fusible layer 23 keeps on being molten at a high temperature, the path of the short circuit will gradually shortened and will be moved toward the inputting electric power. The load current formed on the PTC element 22 will be increased gradually; when it gets a predetermined current value, a fuse is molten and broken, so that the entire loop becomes off.

Therefore, the present invention has the following advantages:

1. In addition to having a function of heat generating, the PTC element of the present invention can change the value of resistance by changing temperature for an AC phase delay shaping circuit and a microprocessor to be used as a reference value for turning on or off of a switch of an automatically controlling trigger circuit; this can effectively give a mechanism to control the temperature of heat generating.
2. Two contact points of a heat generating line provided by the present invention protrude out of a bag to connect a controller, and the PTC element can thus do heat generating and temperature controlling, composition of the PTC element is simplified; this not only can effectively save the cost of material, but also can largely lower the rate of fault.
3. The present invention can automatically heat at a set low temperature, when its temperature exceeds the set temperature, it will automatically turn off to lower its temperature, thus an instant resosne mechanism can be provided.
4. When the heat generating line is overly hot, an insulated heating conductor provided in the present invention starts to get a melting phenomenon to thereby increase the load current of the PTC element; and when the current reaches a predetermined value, a fuse will be molten and broken, this can get a function of safe protecting.

In conclusion, according to the above stated content, the present invention surely can get the expected object thereof to provide a heat generating structure and its temperature control method that not only can control temperature by the feature of the PTC element to simplify the composition of the element and save the cost of material as well as lower the rate of fault, but also can automatically turn off in case of overcurrent to obtain an effect of safety and protection; the present invention thereby has extremely high industrial value.

The invention claimed is:

1. A temperature control method for a heating structure comprising:

a. setting a heating temperature, and making electric conduction;

b. heating a PTC (positive temperature coefficient) element to render a part of current to be input into an AC phase shaping circuit to shape alternative string wave signals into direct current square wave signals waves the PTC element including a core member, a PTC element, an insulating fusible layer and a short circuit line, one end of said PTC element is connected with one end of said short circuit line, and generates heat after being electrically conducted, said AC phase shaping circuit includes an NPN-bipolar transistor, a diode and a resistor;

c. entering a part of current into an AC phase delay shaping circuit to delay string wave signals, and then to convert alternative string wave signals into square wave signals, said AC phase delay shaping circuit includes a resistor-capacitor (RC) circuit, an NPN-bipolar transistor, a diode and a resistor;

d. during the heating step b) said PTC element, measuring by a microprocessor at a given time a phase shift between said direct current square wave signals respectively converted by said AC phase shaping circuit and said AC phase delay shaping circuit; and e. controlling a switch of a trigger circuit to form a turning on or off state, in order to heat or reduce temperature of said PTC element to keep a heat generating line at a predetermined working temperature.

2. The temperature control method for a heating structure as in claim 1, wherein said structure further comprises a time controlling device to control heating time of said heat generating line.

3. A heating structure comprising:

a heat generating line including a core member, a PTC element, an insulating fusible layer and a short circuit line, one end of said PTC element is connected with one end of said short circuit line, and generates heat after being electrically conducted; and a controller connected respectively with said PTC element and the other end of said short circuit line, and includes an electric circuit board provided with an AC phase shaping circuit and an AC phase delay shaping circuit to convert alternative string wave signals into square wave signals, and when current flowing through said AC phase delay shaping circuit changes, a phase shift between said two phase shaping circuits change; and by the measuring of a microprocessor provided on said electric circuit board, a turning on or off state of a trigger circuit is controlled to heat or reduce temperature of said PTC element to keep said heat generating line at a predetermined working temperature, wherein said AC phase shaping circuit includes an NPN-bipolar transistor, a diode and a resistor, wherein said AC phase delay shaping circuit includes a resistor-capacitor (RC) circuit, an NPN-bipolar transistor, a diode and a resistor.

4. The heating structure as in claim 3, wherein said insulating fusible layer is between said PTC element and said short circuit line.

5. The heating structure as in claim 3, wherein said heat generating line includes thereover a cover layer.

6. The heating structure as in claim 5, wherein said core member, said PTC element, said insulating fusible layer, said short circuit line and said cover layer are arranged sequentially outwards from inside.

7. The heating structure as in claim 3, wherein said PTC element is a line winding around said core member.

8. The heating structure as in claim 3, wherein said insulating fusible layer is made of polyethylene (PE) with a melting temperature 125–130° C.

9. The heating structure as in claim 3, wherein said trigger circuit includes a switch to control conducting or non-conducting of current, said switch is a triac.

10. The heating structure as in claim 3, wherein said heating structure has a bag to receive said heat generating line.

* * * * *